US010942241B2

(12) United States Patent
Stroiescu et al.

(10) Patent No.: US 10,942,241 B2
(45) Date of Patent: Mar. 9, 2021

(54) SYSTEM FOR INDOOR AND OUTDOOR POSITION MEASUREMENT

(71) Applicant: Statsports Group Limited, Newry (GB)

(72) Inventors: Florin Stroiescu, Dublin (IE); Alan Clarke, Bessbrook (GB); Sean O'Connor, Bellurgan (IE); Valeriu Emanuel Ionita, Drogheda (IE)

(73) Assignee: STATSPORTS GROUP LIMITED, Newry (GB)

( * ) Notice: Subject to any disclaimer, the term of this patent is extended or adjusted under 35 U.S.C. 154(b) by 155 days.

(21) Appl. No.: 16/092,675

(22) PCT Filed: Mar. 30, 2017

(86) PCT No.: PCT/GB2017/000046
§ 371 (c)(1),
(2) Date: Oct. 10, 2018

(87) PCT Pub. No.: WO2017/178777
PCT Pub. Date: Oct. 19, 2017

(65) Prior Publication Data
US 2019/0170845 A1 Jun. 6, 2019

(30) Foreign Application Priority Data

Apr. 11, 2016 (GB) ...................... 1606167

(51) Int. Cl.
*G01S 1/02* (2010.01)
*G01S 5/10* (2006.01)
*G01S 5/14* (2006.01)
(52) U.S. Cl.
CPC ................ *G01S 1/024* (2013.01); *G01S 5/10* (2013.01); *G01S 5/14* (2013.01)

(58) Field of Classification Search
CPC ... G01S 1/024; G01S 1/08; G01S 5/10; G01S 5/14
See application file for complete search history.

(56) References Cited

U.S. PATENT DOCUMENTS

2012/0252503 A1 10/2012 Wu

FOREIGN PATENT DOCUMENTS

EP  2653886 A1  10/2013
WO  2017063271 A1  4/2017

OTHER PUBLICATIONS

International Search Report for PCT/GB2017/000046 dated Jul. 21, 2017, 5 pages.

(Continued)

*Primary Examiner* — Dao L Phan
(74) *Attorney, Agent, or Firm* — Faegre Drinker Biddle & Reath LLP

(57) ABSTRACT

A system and method for measuring the position of one or more object in an area of interest. The system has a primary beacon located at a first fixed position in or near the area of interest which generates a time referenced primary signal, two or more secondary beacons located at different fixed positions in or near the area of interest which generate time referenced secondary signals and one or more portable tag, the portable tag being attachable to the object. The portable tag has a portable tag circuit for calculating the distance of the portable tag to the primary and secondary beacons by means of a time of flight calculation which uses, the known position of the primary and secondary beacons, time referenced signals and delay information associated with the time referenced signals, such that the portable tag calculates its own position.

26 Claims, 7 Drawing Sheets

Positioning system

(56) References Cited

OTHER PUBLICATIONS

Written Opinion of International Searching Authority for PCT/GB2017/000046 dated Jul. 21, 2017, 8 pages.

Positioning system

Primary beacon architecture

Secondary beacon

Wearable device

Standard time-of-flight measurement

Compensated time-of-flight measurement

System pulses diagram

Position calculation

Position calculation by the intersection of parabolas

Parabola as a geometric place

SYSTEM FOR INDOOR AND OUTDOOR POSITION MEASUREMENT

INTRODUCTION

The present invention relates to a system and method for real time measurement of the position of one or more object and in particular to the measurement of the position and movement of individuals participating in an activity such as a team sport.

BACKGROUND TO THE INVENTION

There are many situations where the real time precise measurement of the position of objects or persons is needed, such as in team and individual sports, inventory location, construction sites, security, surveying, and many others. In team sports, for example, the position and movement of individual players in the context of the team and the opposing team can provide valuable information on player and team performance. Other data such as player speed, distance covered, acceleration and player position is also very valuable. Obtaining this data requires the creation of highly accurate and reliable systems for measuring player position and movement.

There are a number of known systems and methods for position measurement for example.

Global Positioning System (GPS) is a space-based navigation system that provides location and time information in all weather conditions, anywhere on or near the Earth where there is an unobstructed line of sight to four or more GPS satellites. However, such systems may not be used indoors.

An alternative to GPS which may be used indoors uses local beacons that have been precisely placed and need to have very high precision clocks to provide the required level of positional accuracy. In some cases, expensive time-of-flight based devices, using extremely precise timing circuits are used. However, these are hard to maintain and use.

There are also a number of mapping and surveying techniques for wireless signals such as Skyhook4, Wifarer 5, Google6. However, these are expensive, have limited precision, and need to be reconfigured whenever the local wireless routers network changes.

The Decawave7 system uses wireless sensors networks in ultra-wide-band radio frequency range. In this case, there is a need to maintain the network mesh at all times.

The process of calculating a current position by Dead Reckoning uses a previously determined position or fix and calculates the current position using information on speed and direction of travel such as would be provided using accelerometers and gyroscopes. These techniques lack precision.

Optical techniques such as the use of Light Emitting Diodes are also known. The Bytelight, system is a retail solution which works by locating shoppers and offering up timely info on the back of an awareness of their proximity to the beacon; such systems require a perfect line of sight for their successful operation.

SUMMARY OF THE INVENTION

The present invention provides a system and method for measuring in real time and with high accuracy, the position of specially designed wearable receivers. The measurement applies both in large indoor areas and in limited area outdoor environments.

In one aspect of the invention the position of a portable tag is measured using two separate and distinct methods in order to verify the accuracy of the measurements and to account for random errors which may occur such as circuit timing and synchronisation errors.

In accordance with a first aspect of the invention there is provided a system for measuring the position of one or more object in an area of interest, the system comprising:
a primary beacon located at a first fixed position in or near the area of interest, the primary beacon comprising:
  a primary signal generator which generates a time referenced primary signal;
  a primary transceiver for sending the primary signal to two or more secondary beacons and to one or more portable tag and for receiving an echo signal; and
  a primary circuit for measuring the time at which the primary signal is sent and echo signal are received by the primary beacon,
two or more secondary beacons located at different fixed positions in or near the area of interest, the secondary beacon comprising:
  a secondary signal generator which generates a time referenced echo signal in response to the receipt of the primary signal; and
  a secondary transceiver for receiving the primary signal and transmitting the echo signal to one or more portable tag and to the primary beacon;
  and a secondary circuit for measuring the time at which the primary signal is received and echo signal sent;
one or more portable tag, the portable tag being attachable to the object, the portable tag comprising:
  a tag receiver for receiving and measuring the time referenced signal from the primary beacon, the time referenced echo from the secondary beacon and receiving time delay information comprising primary signal time delay information and echo signal delay information;
  a portable tag circuit for calculating the distance of the portable tag to the primary and secondary beacons by means of a time of flight calculation which uses, the known position of the primary and secondary beacons, the time referenced signals and the delay information such that the portable tag calculates its own position.

Preferably, the Primary signal delay information associated with a first primary signal is transmitted as part of the time referenced primary signal of a subsequent pulse.

Preferably, the echo signal delay information associated with a first echo signal is transmitted as part of the time referenced echo signal of a subsequent pulse.

Alternatively, the Primary signal delay information is transmitted via a data channel Alternatively, the echo signal delay information is transmitted via a data channel.

Preferably, the primary and secondary signal generators operate at the same frequency.

Preferably, primary beacon is controlled by a microcontroller.

Preferably, the microcontroller is located in the primary beacon.

Preferably, secondary beacon is controlled by a microcontroller.

Preferably, the microcontroller is located in the secondary beacon.

Preferably, portable tag is controlled by a microcontroller.

Preferably, the microcontroller is located in the portable tag.

Preferably, the signals are pulsed radio waves.

Preferably, the primary and secondary signal generators comprises a high frequency oscillator and a switch which cooperate to create a pulsed output from the signal generator.

Preferably, the secondary signal generator comprises a high frequency oscillator and a switch which cooperate to create a pulsed output from the signal generator.

Preferably the pulsed output is time referenced.

Preferably, the secondary beacon signal generator comprises an index reference which uniquely identifies the secondary beacon in the system so as to distinguish between individual secondary beacons.

Preferably, the secondary transceiver has a start input, triggered by an emerging signal, and a stop input triggered by the reception of the return signal.

In this way the time-of-flight is accurately measured, without the intervention of the microcontroller, which is too slow to give accurate results Preferably timing errors of the fast switch are masked by using the reference in the time-of-flight receiver.

Preferably, the secondary transceiver measures the effective delay between the time for incoming primary beacon signal to be received at the secondary beacon and the emerging echo to be transmitted from the secondary beacon.

Preferably, the primary beacon measures the time delay between the emerging signal transmitted by the primary beacon and the echoed pulse received from the secondary beacon.

Preferably, the first signal generator sends a second signal to the secondary beacon and the delay between the first and the second signals is measured on the primary beacon and measured on the secondary beacon to detect errors and drift in the clock frequency.

Preferably, the portable tag has a unique identifier for identifying the device.

Preferably, the portable tag comprises an index reference which uniquely identifies the portable tag in the system so as to distinguish between individual portable tags.

Preferably, the index reference is provided by the microcontroller.

Preferably, the position of the portable tag is calculated by creating a set of curves, each curve separately representing the locus of the points that have a common distance difference between the primary beacon A and a separate secondary beacon such that the intersection between a first curve of the set and a second curve of the set identifies the position of the tag with reference to the respective primary and secondary beacons.

Preferably, the position of the portable tag is calculated by:
dividing the area of interest into n sub-divided areas;
precalculating common distance differences for each of the sub-divided areas; and
comparing the precalculated common distance and time differences with the measured values of the time delays between the primary beacon signal, and the signal from each of the secondary beacons signals to calculate and to determine the relative position of the portable tag compared to the position of the primary and each of the secondary beacons.

Preferably, the calculation uses a fast converging halving algorithm.

Preferably, the pre-calculated table can be scaled independently on each of the axes corresponding to the distance measured between the primary and each of the secondary beacons The present invention uses a system, that is able to precisely measure the interval between several events, and then report it back to the local microcontroller. This is the time-of-flight receiver. Preferably, the time of flight calculation is based on a time to digital converter {TDC). The converter is able to measure the delay between two or more pulses.

Preferably, the signal is a radio frequency signal.

More preferably, the signal is an ultrawideband signal.

In accordance with a second aspect of the invention there is provided a method for measuring the position of one or more object in an area of interest, the method comprising the steps of:
emitting a time referenced pulse from a primary beacon which has a fixed position with respect to the area of interest and recording the time of the pulse emission;
recording the time at which the pulse is received at one or more portable tag which is attached to the object;
recording the time at which the pulse is received at two or more secondary beacons, each having distinct fixed positions with respect to the area of interest;
emitting a time referenced echo from the secondary beacons in response to the pulse;
recording the time at which the echo was sent;
recording the time at which the echo was received by the primary beacon, secondary beacon or portable tag;
and recording time delay information comprising primary signal time delay information and echo signal time delay information;
calculating the distance of the portable tag to the primary and secondary beacons by means of a time of flight calculation which uses, the known position of the primary and secondary beacons, the time referenced signals and the delay information such that the portable tag calculates its own position.

Preferably, the Primary signal delay information associated with a first primary signal is transmitted as part of the time referenced primary signal of a subsequent pulse.

Preferably, the echo signal delay information associated with a first echo signal is transmitted as part of the time referenced echo signal of a subsequent pulse.

Alternatively, the Primary signal delay information is transmitted via a data channel Alternatively, the echo signal delay information is transmitted via a data channel.

Preferably, the primary and secondary signal generators operate at the same frequency.

Preferably, primary beacon is controlled by a microcontroller.

Preferably, the microcontroller is located in the primary beacon.

Preferably, secondary beacon is controlled by a microcontroller.

Preferably, the microcontroller is located in the secondary beacon.

Preferably, portable tag is controlled by a microcontroller.

Preferably, the microcontroller is located in the portable tag.

Preferably, the signals are pulsed radio waves.

Preferably, the primary and secondary signal generators comprises a high frequency oscillator and a switch which cooperate to create a pulsed output from the signal generator.

Preferably, the secondary signal generator comprises a high frequency oscillator and a switch which cooperate to create a pulsed output from the signal generator.

Preferably the pulsed output is time referenced.

Preferably, the secondary beacon signal generator comprises an index reference which uniquely identifies the secondary beacon in the system so as to distinguish between individual secondary beacons.

Preferably, the secondary transceiver has a start input, triggered by an emerging signal, and a stop input triggered by the reception of the return signal.

In this way the time-of-flight is accurately measured, without the intervention of the microcontroller, which is too slow to give accurate results Preferably timing errors of the fast switch are masked by using the reference in the time-of-flight receiver.

Preferably, the secondary transceiver measures the effective delay between the time for incoming primary beacon signal to be received at the secondary beacon, and the emerging echo to be transmitted from the secondary beacon.

Preferably, the primary beacon measures the time delay between the emerging signal transmitted by the primary beacon and the echoed pulse received from the secondary beacon.

Preferably, the first signal generator sends a second signal to the secondary beacon and the delay between the first and the second signals is measured on the primary beacon and measured on the secondary beacon to detect errors and drift in the clock frequency.

Preferably, the portable tag has a unique identifier for identifying the device.

Preferably, the portable tag comprises an index reference which uniquely identifies the portable tag in the system so as to distinguish between individual portable tags.

Preferably, the index reference is provided by the microcontroller.

Preferably, the position of the portable tag is calculated by creating a set of curves, each curve separately representing the locus of the points that have a common distance difference between the primary beacon A and a separate secondary beacon such that the intersection between a first curve of the set and a second curve of the set identifies the position of the tag with reference to the respective primary and secondary beacons.

Preferably, the position of the portable tag is calculated by:
dividing the area of interest into n sub-divided areas;
precalculating common distance and time differences for each of the sub-divided areas; and
comparing the precalculated common distance and time differences with the measured values of the time delays between the primary beacon signal, and the signal from each of the secondary beacons signals to calculate and to determine the relative position of the portable tag compared to the position of the primary and each of the secondary beacons.

Preferably, the calculation uses a fast converging halving algorithm.

Preferably, the pre-calculated table can be scaled independently on each of the axes corresponding to the distance measured between the primary and secondary beacons The present invention uses a method that is able to precisely measure the interval between several events, and then report it back to the local microcontroller. This is a time-of-flight calculation. Preferably, the time of flight calculation is based on a time to digital converter {TDC). The converter is able to measure the delay between two or more pulses.

In accordance with a third aspect of the invention there is provided a computer program comprising program instructions for implementing the method of the second aspect of the invention.

In accordance with a fourth aspect of the invention there is provided a primary beacon for use in a system in accordance with the first aspect of the invention, the primary beacon comprising:

a primary signal generator which generates a time referenced primary signal;

a primary transceiver for sending the primary signal to two or more secondary beacons and to one or more portable tag and for receiving an echo signal; and a primary circuit for measuring the time at which the primary signal is sent and echo signal are received by the primary beacon, In accordance with a fifth aspect of the invention there is provided a secondary beacon for use in a system in accordance with the first aspect of the invention, the secondary beacon comprising:

a secondary signal generator which generates a time referenced echo signal in response to the receipt of the primary signal; and a secondary transceiver for receiving the primary signal and transmitting the echo signal to one or more portable tag and to the primary beacon;

and a secondary circuit for measuring the time at which the primary signal is received and echo signal sent.

In accordance with a sixth aspect of the invention there is provided a portable tag for use in a system in accordance with the first aspect of the invention, the portable tag comprising:
the portable tag being attachable to the object, and comprising:
a tag receiver for receiving the time referenced signal from the primary beacon, the time referenced echo from the secondary beacon, time delay information comprising primary signal time delay information and echo signal delay information;

a portable tag circuit for calculating the difference of distance of the portable tag to the primary and secondary beacons by means of a time of flight calculation which uses, the known position of the primary and secondary beacons, the time referenced signals, the delay information of the transmission in the secondary tag, and the primary to the secondary beacons distance ("pitch dimensions") information, such that the portable tag calculates its own position.

In accordance with a seventh aspect there is provided a system or method for measuring the position of one or more object in an area of interest. The system has a primary beacon located at a first fixed position in or near the area of interest which generates a time referenced primary signal, two or more secondary beacons located at different fixed positions in or near the area of interest which generate time referenced secondary signals and one or more portable tag, the portable tag being attachable to the object. The portable tag has a portable tag circuit for calculating the distance of the portable tag to the primary and secondary beacons by means of a time of flight calculation which uses, the known position of the primary and secondary beacons, time referenced signals and delay information associated with the time referenced signals, such that the portable tag calculates its own position.

BRIEF DESCRIPTION OF THE DRAWINGS

The present invention will now be described with reference to the accompanying drawings in which.

DETAILED DESCRIPTION OF THE DRAWINGS

The system of the present invention provides accurate, real time information on the position of objects within an area of interest up to an area of around 10 times the maximum size of a standard soccer pitch, the standard pitch having maximum dimensions of 90 m×120 m.

Figure 1:
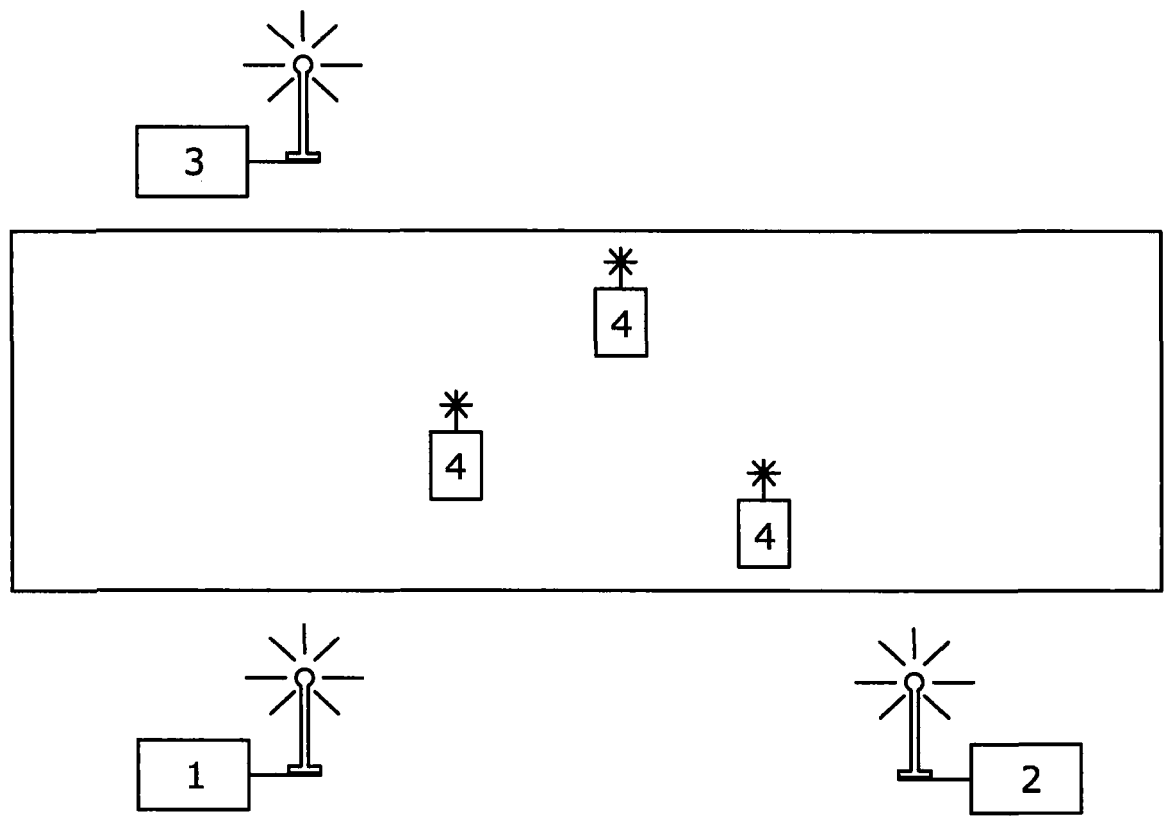
FIG. 1 is a schematic diagram of a first embodiment of the system in accordance with the present invention.

FIG. 1 shows an example of a system in accordance with the present invention where the system has been deployed for use on a sports pitch having area A, the area of interest. In this example, the system comprises a primary beacon 1 positioned near the side of area A, a secondary beacon 2 positioned on the same side of area A as the primary beacon 1 and a secondary beacon 3 positioned on the opposite side of area A from primary beacon 1 and secondary beacon 2. In this example, secondary beacons 2, 3 are spaced from primary beacon 1 in such way that straight lines connecting their position would form a right angled triangle. Other locations for the beacons may be used insofar as a direct line of sight is maintained between the beacons.

Portable tags or wearable receivers 4 are shown within the area of interest A. In this example, a portable tag has been attached to three separate players. During a game, the players may move around the area of interest A and the portable tags 4 receive signals transmitted from the primary beacon 1 and the secondary beacons 2, 3. In this and other embodiments, on the data channel, the portable tags are able to transmit, back to the primary beacon and/or secondary beacons, information comprising its own position, kinematics data, and/or any other physical measurements data.

The system of the present invention uses beacons which emit a signal, accordingly receipt and transmission of the signals is required. In the context of a sports pitch where players may be in close contact in front of and around one another, the degree to which a line-of-sight is maintained is sufficient to allow the system to operate successfully.

In this and other embodiments of the present invention, distance and position measurement signals from the signal generator are sent over a dedicated radio channel or data channel integrated in the time referenced primary pulses and echo pulses.

Where a dedicated radio channel is used it may employ a standard protocol (802.15.4, ZigBee, WiFi radio modem) for data transmission.

This may include positioning data feedback and other metrics relating to player movement and health such as player speed, acceleration, temperature and heart rate.

In other embodiments of the invention more radio channels may be used and, the time-of-flight integrated data channel may use another radio channel and/or protocol.

In use, the system of the present invention as shown in FIG. 1 allows the calculation of the position of a number of objects in an area of interest where the object is fitted with a portable tag 4.

In order to calculate the position of each of the portable tags 4, the primary beacon 1 is positioned at a first fixed position at the side of the sports pitch A. As described in more detail with reference to FIG. 2, the primary beacon 1 has a signal generator, a transceiver for sending the signal to the secondary beacons 2, 3 and to the portable tags 4 and a data receiver.

The secondary beacons 2, 3 are located at separate fixed locations at the side of the pitch. As described in more detail with reference to FIG. 3, the secondary beacons each comprise a signal generator, a second transceiver for sending and receiving the signal to the portable tags 4 and to the primary beacon 1. The secondary beacons 2, 3 further comprise data transceivers which receive and transmits data relating to the operation of the secondary beacon. As described in more detail with reference to FIG. 4, the portable tags 4 comprise a transceiver operating for receiving and sending signals from the primary beacon 1 and/or the secondary beacons 2, 3 and a data transceiver which receives and transmits data relating to the operation of the portable tag.

The primary beacon, is connected to a computer that processes data received from the other components of the system over the secondary channel, which is unrelated to tag position. The distance between one of the portable tags 4 and the primary and secondary beacons is calculated by measuring the time it takes for a signal round trip from the portable tag to primary and secondary beacons using a Time-of-Flight calculation. The data channel is used to transmit the internal delay 33 and which corrects the Time of Flight value and provides a more accurate calculation of the position of the portable tag. The secondary beacons can be connected to computer if data transmission needs to be enlarged.

Figure 2:
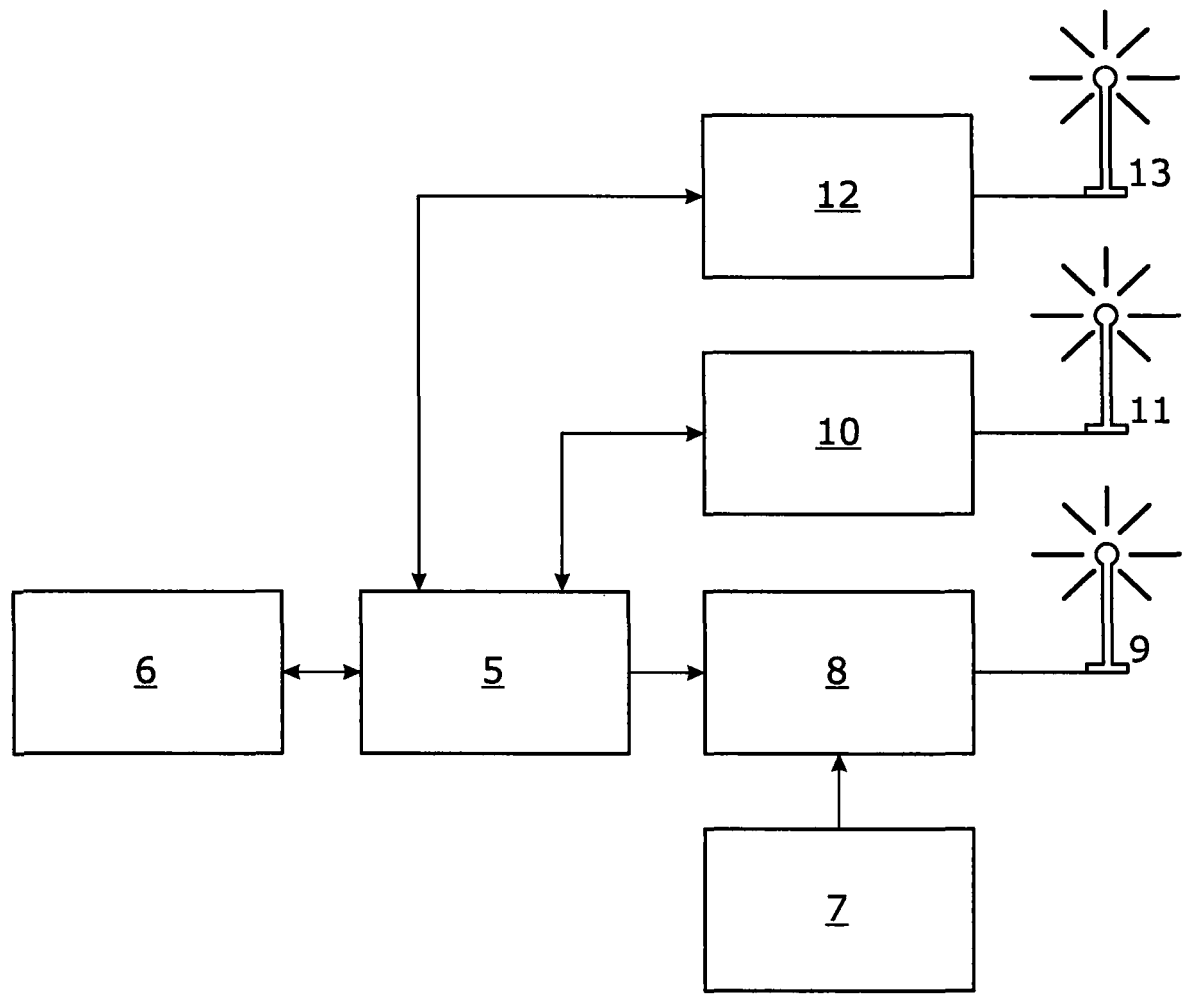
FIG. 2 is a schematic diagram which shows the architecture of an example of a primary beacon in accordance with the present invention.

FIG. 2 is a schematic diagram which shows the architecture of the primary beacon used in the example of the present invention described with reference to FIG. 1.

FIG. 2 shows a microcontroller 5 which controls the functionality of the primary beacon and is connected to a host computer via the microcontroller interface 6. The first signal generator comprises a high frequency oscillator 7 which, oscillates continuously and which is switched by the fast switch 8 to produce time referenced trains of pulses which are transmitted to the secondary beacons and the portable tags through the antenna 9.

The time-of-flight receiver 10 records accurately the time when the pulses are sent from the primary beacon 1, and the time when the response time-of-flight pulses sent from the secondary beacons and/or the portable tags are received using antenna 11.

The timing errors of the fast switch 8 are corrected using the pulse time delay information in the time-of-flight receiver. The data, including positioning data from the secondary beacons, and from the wearable receivers in the field are communicated via data transceiver 12 and antenna 13.

Figure 3:
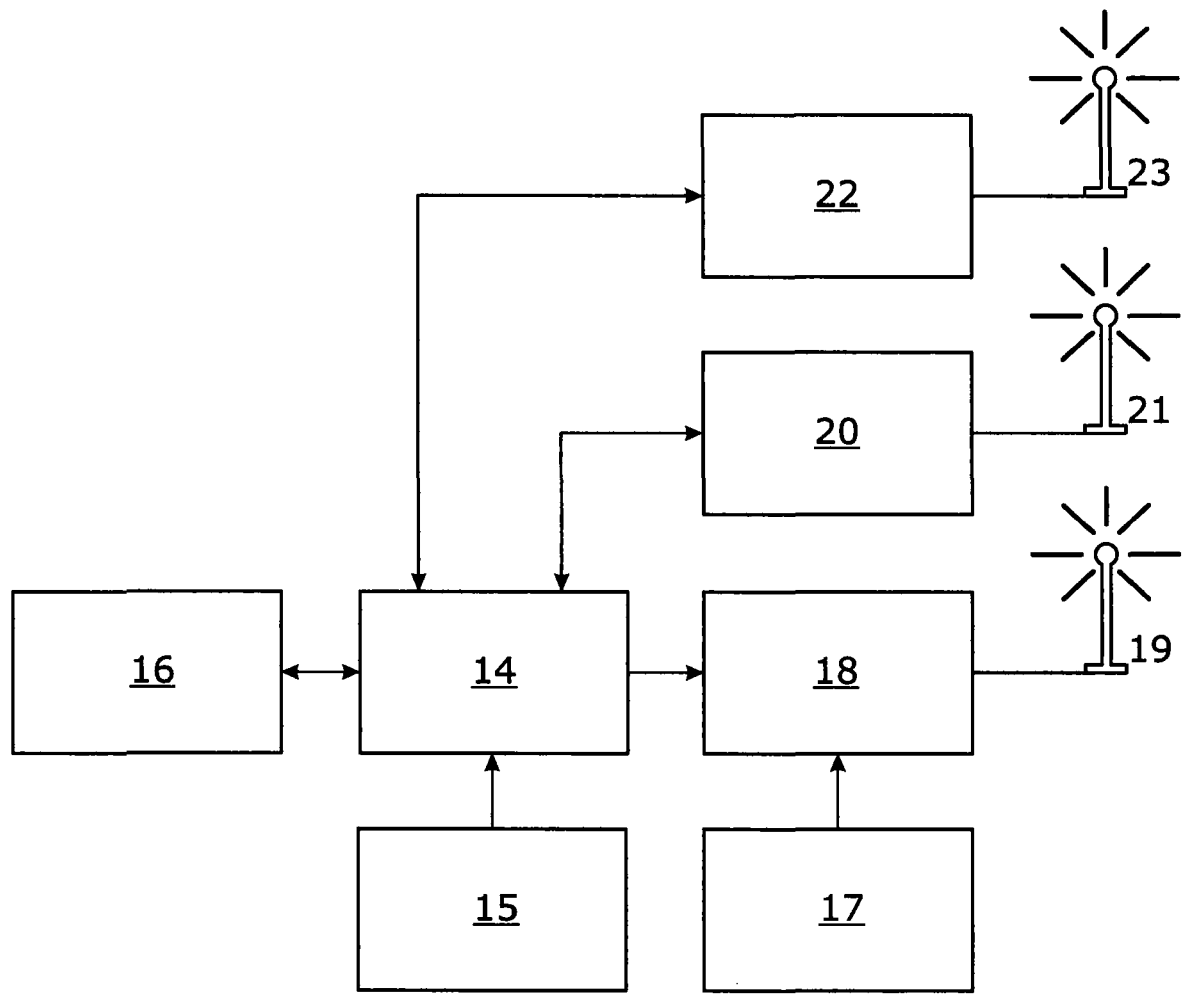
FIG. 3 is a schematic diagram which shows the architecture of an example of a secondary beacon in accordance with the present invention.

FIG. 3 is a schematic diagram which shows the architecture of an example of a secondary beacon in accordance with the present invention.

The microcontroller 14 controls the functionality of the secondary beacon. The microcontroller may communicate with a host computer via the microcontroller interface 16. Index reference 15 uniquely identifies the secondary beacon in the system so as to distinguish between individual secondary beacons. The system has a high frequency oscillator 17, oscillating continuously, which is switched by the fast switch 18 to send to the other components of the system time reference (trains of) pulses through the antenna 19. The time-of-flight receiver 20 records accurately the time when the pulses received from the primary beacon are received, and the time when the response time-of-flight pulses are sent using antenna 21.

The inherent timing errors of the fast switch 18 are masked by using the reference in the time-of-flight receiver. The data, including timing information for the pulses received and sent are communicated via data transceiver 22 and antenna 23.

Figure 4:
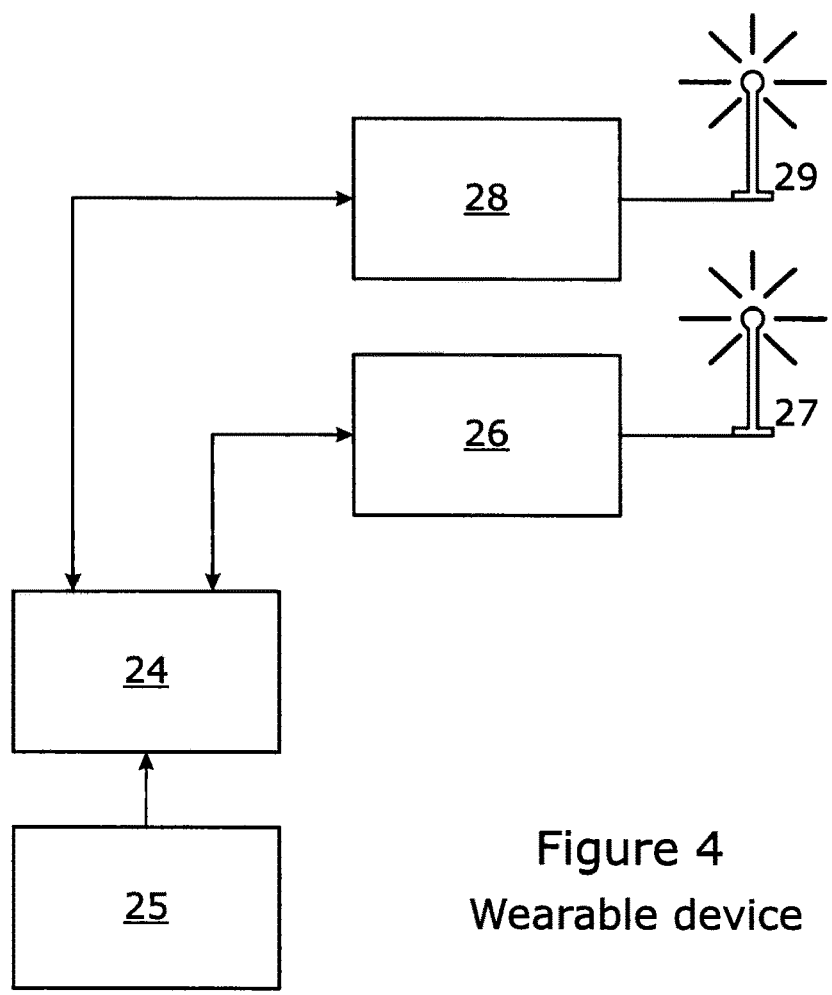
FIG. 4 is a schematic diagram which shows the architecture of an example of a portable tag in accordance with the present invention.

FIG. 4 is a schematic diagram which shows the architecture of an example of the wearable device or portable tag in accordance with the present invention. The microcontroller 24 uses the index reference 25 for uniquely identifying the device to the system. The time-of-flight receiver 26 records accurately the difference in time between the pulses received from the main and the secondary beacons. These pulses are received using antenna 27. The data, including information comprising of own position, kinematics data, and/or any other physical measurements data are communicated via data transceiver 28 and antenna 29.

In the above example, the core components of the system are consistent across the primary beacon, the secondary beacons and the portable tags and comprises a circuit that is able to precisely measure the interval between several events, and then report it back to the local microcontroller. This is the time-of-flight receiver, based on a time to digital converter (TDC). The converter is able to measure the delay between two or more pulses.

Time-of-flight may be measured as the time that the signal travels between a primary beacon to the secondary beacon, and then back. This measurement is depicted in FIG. 5.

Figure 5:
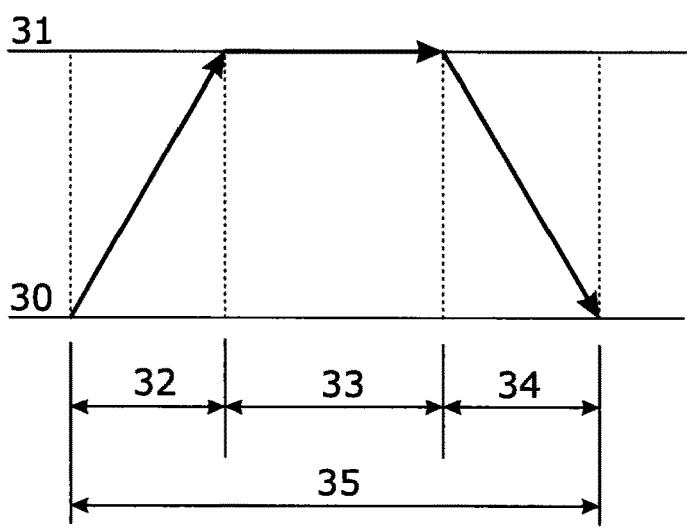
FIG. 5 is a diagram which shows a standard time of flight measurement.

In FIG. 5, the intersection between line 30 and the vectors represents the primary beacon events. The intersection between line 31 and the vectors represents the secondary beacon events.

The primary beacon transmits a pulse which is transmitted to the second beacon in the time interval 32, the secondary beacon sends back an echo with an un-avoidable time delay 33, which takes to transmit to the primary beacon the interval 34, equal with the interval 32 if the beacons are stationary. By measuring the round-trip time 35, and knowing the delay 33, the effective time of flight and the distance between the beacons can be computed.

In order to avoid measurement errors, the primary beacon measures the round trip (32)+(33)+(34)=(35) as the delay between the sending of the pulse, and the receiving of the echo, measured as well with the time-flight-receiver. The time-of-flight receiver has a Start input, triggered by the emerging pulse, and a Stop input triggered by the reception of the echo pulse. In this way, the time-of-flight is accurately measured, without the intervention of the microcontroller, which is too slow to give accurate results for such fast processes.

The time delay 33 cannot be easily controlled, and with standard microcontroller techniques jitter of over 20 ns, or even 100 ns are expected. These delays can easily produce calculated errors between 3 and 15 m, or even bigger when other perturbing factors are considered. In order to compensate for this arbitrary delay, the time-of-flight receiver on the secondary beacon measures the effective delay between the emergent primary beacon to secondary beacon pulse reception, and the echoed pulse from the secondary beacon to the primary beacon. This measured delay is then transmitted over the data channel back to the primary beacon, which has now the means to calculate the effective time-of-flight of the pulse.

The calculated distance is:

$$D=(T(35)-T(33))*c/2$$

where:
D is the distance between the beacons;
T(35) is the time measured for the round trip;
T(33) is the time transmitted back, via the data channel, to the primary beacon; c is the speed of light in air (for terrestrial measurements, 299,705,000 m/s).

Figure 6:
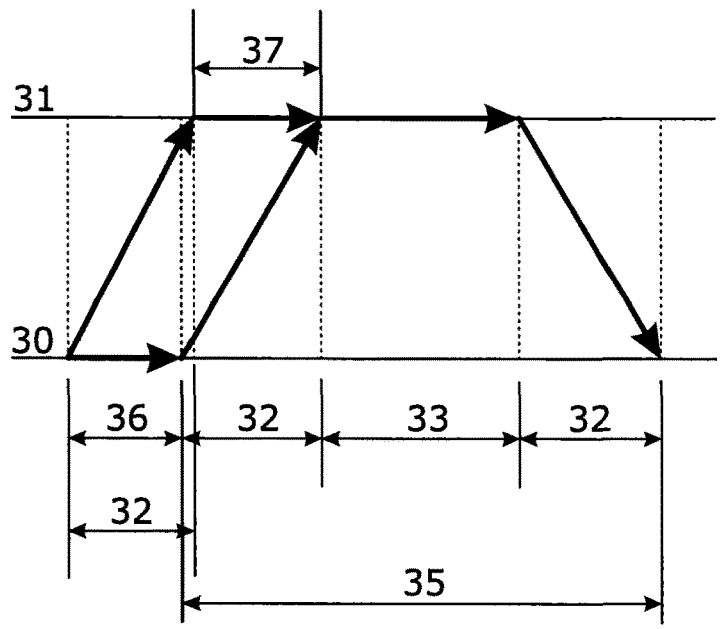
FIG. 6 is a diagram which shows a compensated time of flight measurement.

FIG. 6 is a diagram which shows a compensated time of flight measurement which relates to clock errors. Another perturbing factor is the fact that the frequency of the clocks of the time-of-flight receivers can differ or drift. This can be compensated by sending two pulses from the primary beacon, and comparing the delay between these pulses measured on the primary beacon and measured on the secondary beacon.

In FIG. 6, the intersection between line 30 and the vectors represents the primary beacon events. The intersection between line 31 and the vectors represents the secondary beacon events.

Considering that the distance between the beacons is the same as in the case of FIG. 5, the delay 32 is the same. In the ideal case, the delay 36 measured between the two pulses sent from the primary beacon, and the delay 37 measured between the reception of the two pulses on the secondary beacon shall be equal. However, the drift or difference in frequency between the two beacons can account for different values measured. In this case, sending back on the data channel the value of the time delay 37 can be used for correcting the time delay 33, this improving the precision of the time-of-flight measurement.

Applying the described techniques, the distance between the beacons can be accurately calculated as:

$$D=(T(35)-T(33)*T(36)/T(37))*c/2$$

where:
D is the distance between the beacons;
T(35) is the time measured for the round trip;
T(32) is the time transmitted back, via the data channel to the primary beacon;
T(36) and T(37) are the delays between the primary beacon reference pulses, measured by the primary beacon, and respectively measured by the secondary beacon; c is the speed of light in air (for terrestrial measurements, 299,705, 000 m/s).

Figure 7:
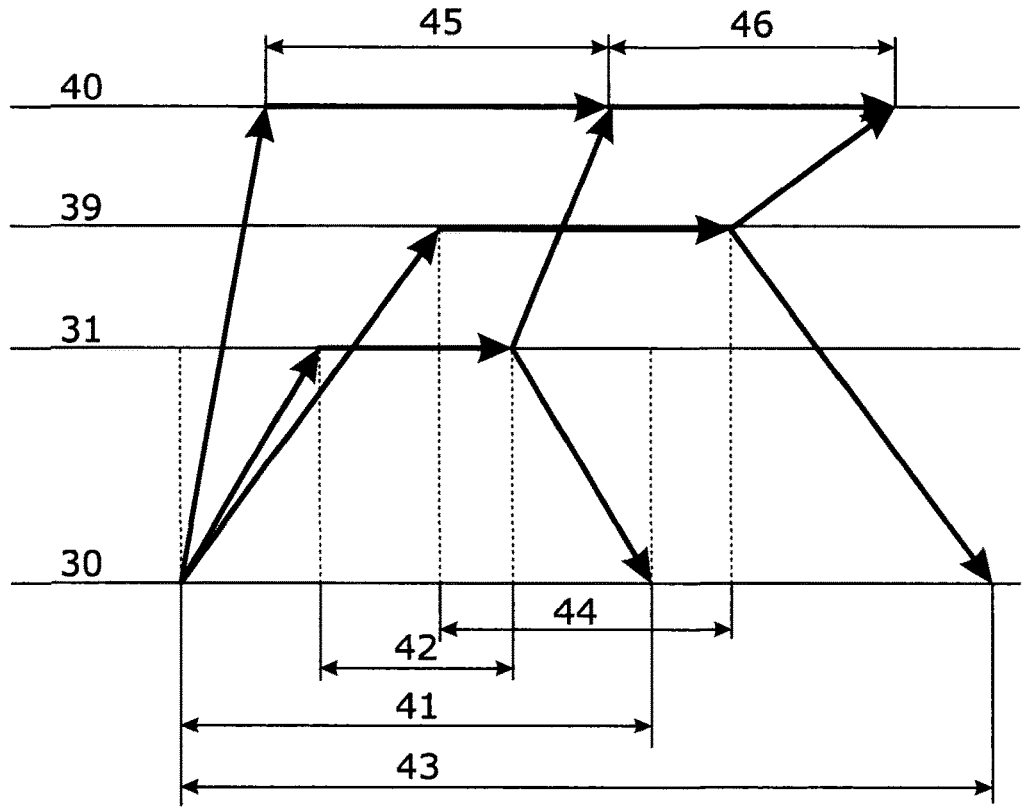
FIG. 7 is a system pulse diagram.

The wearable receivers are receiving the pulses from all the beacons, measuring the delay between the main beacon pulse, and the secondary beacons pulses. The pulses diagram for the whole system is depicted in FIG. 7. For simplicity reasons, only the standard time-of-flight technique is depicted here, but corrections as for clock frequency errors may be included.

The intersection between line 30 and the vectors represents the primary beacon events. The intersection between line 31 and the vectors represents the first secondary beacon events. The intersection between line 39 and the vectors represents the second secondary primary events. The intersection between line 40 and the vectors represents one of the wearable devices events (the wearable device is not transmitting on the timing channel).

The interval 41 is the first secondary beacon round trip, while the interval 42 is the delay in the first secondary beacon. Using 41 and 42 the distance between the primary beacon and the first secondary beacon can be calculated, as shown above.

The interval 43 is the second secondary beacon round trip, while the interval 44 is the delay in the second secondary beacon. Using 43 and 44 the distance between the primary beacon and the second secondary beacon can be calculated, as shown above.

The interval 45 is the delay between the reception of the primary beacon pulse received by the wearable device, and the reception of the first secondary beacon pulse. The interval 46 is the delay between the reception of the first secondary beacon pulse received by the wearable device, and the reception of the second secondary beacon pulse. These intervals are used to calculate the position of the portable tag relative to the beacons. Any number of portable tags can be included in the system and each can calculate its own position using the primary beacon pulses, secondary beacon echo and delay signals.

Figure 8:
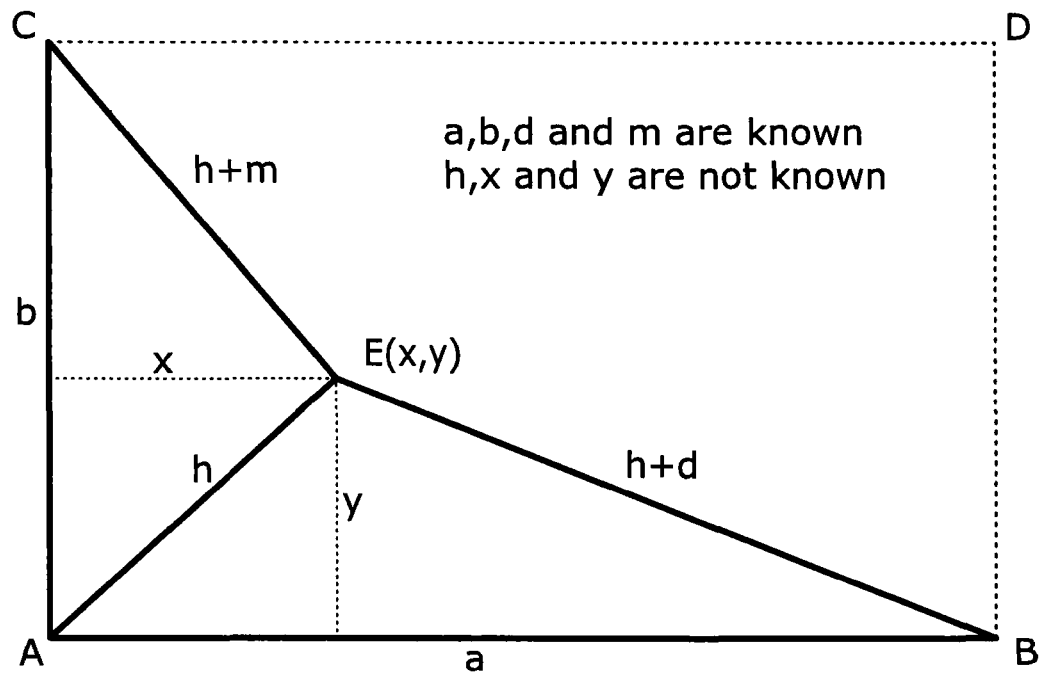
FIG. 8 is a diagram showing an object position calculation

Arranging the beacons in a perpendicular manner as shown in FIG. 8 allows for the calculation of the position of each of the wearable devices relative to the primary beacon from the positioning data transmitted to the tag. Using 4 beacons, the position of the wearable device can be calculated with arbitrary positioning of the beacons. FIG. 8 depicts a geometric representation that applies to the calculation of the position of the receiver.

In FIG. 8, A is the position of the primary beacon, considered to be the origin of the coordinates system, B and C are positions of the secondary beacons, and E is the position of the wearable receiver. The position of the wearable receiver (x,y) is the solution of the equations system shown below $$\sqrt{(x-a)^2+y^2}-\sqrt{x^2+y^2}=d$$

$$\sqrt{x^2+(y-b)^2}-\sqrt{x^2+y^2}=m|$$

The solution of the above equations system is the intersection of two parabolas in the pitch area, and it is calculated on each of the portable tags in the area.

Figure 9:
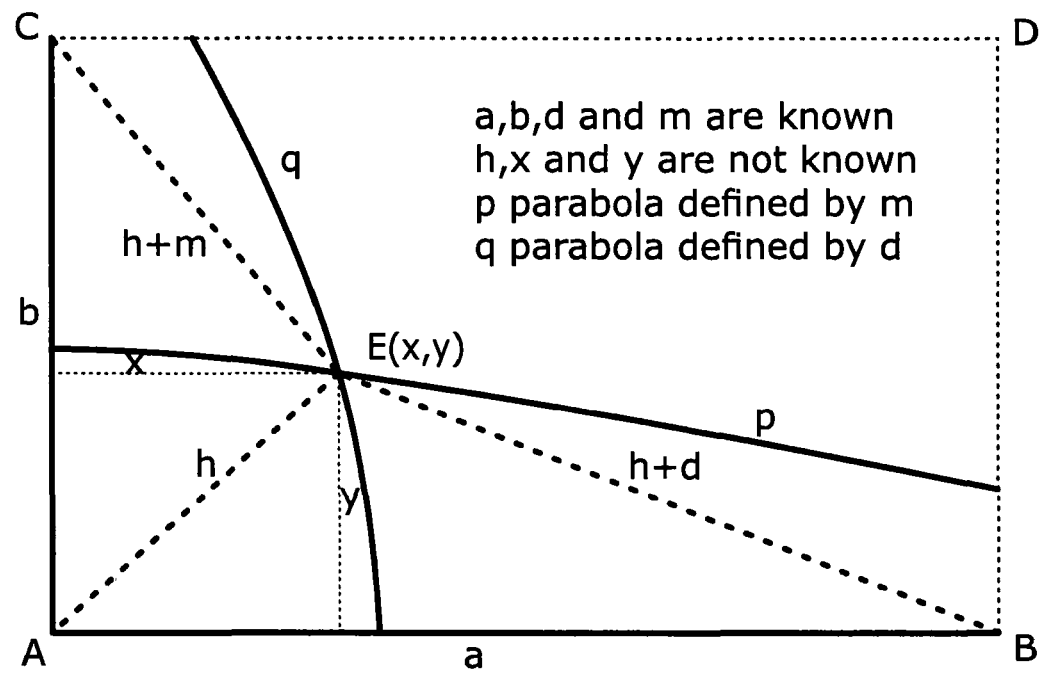
FIG. 9 illustrates the calculation of portable tag position using the intersection of parabolas.

FIG. 9 is the representation of the intersection of the two parabolas. Determining the position of the tags. The parabola "p" is determined by the delay "m", representing the geometric place of all the points that have the common distance difference between the primary beacon A and the secondary beacon C.

The parabola "q" is determined by the delay "d", representing the geometric place of all the points that have the common distance difference between the primary beacon A and the secondary beacon B. The common distance difference translates, in terms of time-of-flight, in constant delay between the two receiving signals.

Figure 10:
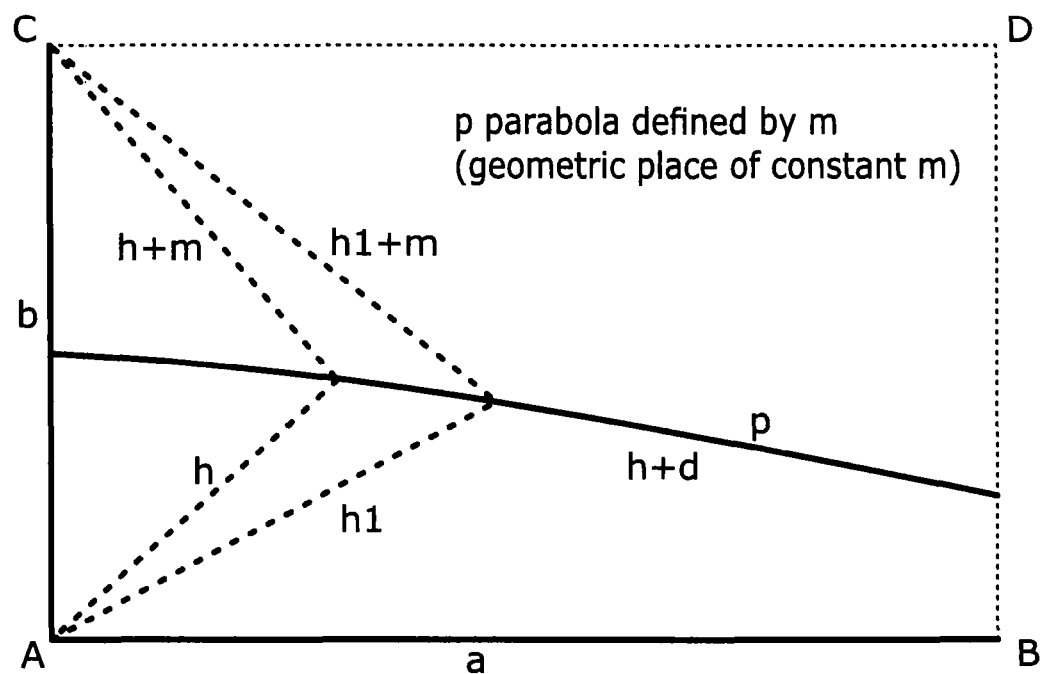
FIG. 10 illustrates the parabola determined by distance "m" (or the inferred delay) as a geometric place where "m" is constant.

FIG. 10 depicts the parabola determined by the common distance difference "m" (or the inferred delay) as a geometric place where "m" is constant.

In one or more embodiments of the present invention, the time efficiency of calculating tag position is improved as follows.

A pre-calculated lookup table is created containing the delays in each of the divisions of the pitch (as example 10×10 cm for a pitch of 100×100 m) is recorded in each of the portable tags and used with a fast converging halving algorithm to efficiently determine the relative position of the portable tag compared to the position of the primary and secondary beacons. A scaling method was designed, so the pre-calculated table can be scaled independently on each of the axes corresponding to the distance measured between the primary and secondary beacons. More, a single lookup table is sufficient for both axes.

The method and the system apparatus described in this disclosure have the following characteristics:
easy to install, just several minutes for deployment of a new location;
on the fly calibration, a single precise beacon is necessary; no surveying
minimum three beacons, arbitrary placed, for a full deployment, more beacons for redundancy and increased precision, or larger area coverage possible;
can measure the location of an unlimited number of wearable receivers;
cheap to implement and deploy Improvements and modifications may be incorporated herein without deviating from the scope of the invention.

The invention claimed is:

1. A system for measuring the position of one or more object in an area of interest, the system comprising:
a primary beacon located at a first fixed position in or near the area of interest, the primary beacon comprising:
a primary signal generator which generates a time referenced primary signal;
a primary transceiver for sending the primary signal to two or more secondary beacons and to one or more portable tag and for receiving an echo signal; and
a primary circuit for measuring the time at which the primary signal is sent and echo signal are received by the primary beacon,
two or more secondary beacons located at different fixed positions in or near the area of interest, the secondary beacon comprising:
a secondary signal generator which generates a time referenced echo signal in response to the receipt of the primary signal;
a secondary transceiver for receiving the primary signal and transmitting the echo signal to one or more portable tag and to the primary beacon; and
a secondary circuit for measuring the time at which the primary signal is received and echo signal sent;
one or more portable tag, the portable tag being attachable to the object, the portable tag comprising:
a tag receiver for receiving and measuring the time referenced signal from the primary beacon, the time referenced echo from the secondary beacon and time delay information comprising the delay between the reception of the signal from the primary beacon in the secondary beacon and the transmission of the echo signal from the secondary beacon, the time difference information being transmitted by the secondary beacon;
a portable tag circuit for calculating the distance of the portable tag to the primary and secondary beacons by means of a time of flight calculation which uses, the known position of the primary and secondary beacons, the time referenced signals and the delay information such that the portable tag calculates its own position and wherein, the primary signal delay information associated with a first primary signal is transmitted as part of the time referenced primary signal of a subsequent pulse.

2. A system as claimed in claim 1 wherein, the echo signal delay information associated with a first echo signal is transmitted as part of the time referenced echo signal of a subsequent pulse.

3. A system as claimed in claim 1 wherein, the primary signal delay information is transmitted via a data channel.

4. A system as claimed in claim 1 wherein, the echo signal delay information is transmitted via a data channel.

5. A system as claimed in claim 1 wherein, the primary and secondary signal generators operate at the same frequency.

6. A system as claimed in claim 1 wherein, primary beacon is controlled by a microcontroller.

7. A system as claimed in claim 6 wherein, the microcontroller is located in the primary beacon.

8. A system as claimed in claim 1 wherein, secondary beacon is controlled by a microcontroller.

9. A system as claimed in claim 8 wherein, the microcontroller is located in the secondary beacon.

10. A system as claimed in claim 1 wherein, the portable tag is controlled by a microcontroller.

11. A system as claimed in claim 10 wherein, the microcontroller is located in the portable tag.

12. A system as claimed in claim 1 wherein, the signals are pulsed radio waves.

13. A system as claimed in claim 1 wherein, the primary and secondary signal generators comprises a high frequency oscillator and a switch which cooperate to create a pulsed output from the signal generator.

14. A system as claimed in claim 1 wherein, the secondary signal generator comprises a high frequency oscillator and a switch which cooperate to create a pulsed output from the signal generator.

15. A system as claimed in claim 1 wherein, the secondary beacon signal generator comprises an index reference which uniquely identifies the secondary beacon in the system so as to distinguish between individual secondary beacons.

16. A system as claimed in claim 1 wherein, the secondary transceiver has a start input, triggered by an emerging signal, and a stop input triggered by the reception of the return signal.

17. A system as claimed in claim 1 wherein, the secondary transceiver measures the effective delay between the time for incoming primary beacon signal to be received at the secondary beacon and the emerging echo to be transmitted from the secondary beacon.

18. A system as claimed in claim 1 wherein, the primary beacon measures the time delay between the emerging signal transmitted by the primary beacon and the echoed pulse received from the secondary beacon.

19. A system as claimed in claim 1 wherein, the first signal generator sends a second signal to the secondary beacon and the delay between the first and the second signals is measured on the primary beacon and measured on the secondary beacon to detect errors and drift in the clock frequency.

20. A system as claimed in claim 1 wherein, the portable tag has a unique identifier for identifying the device.

21. A system as claimed in claim 1 wherein, the portable tag comprises an index reference which uniquely identifies the portable tag in the system so as to distinguish between individual portable tags.

22. A system as claimed in claim 21 wherein, the index reference is provided by the microcontroller.

23. A system as claimed in claim 1 wherein, the position of the portable tag is calculated by creating a set of curves, each curve separately representing the locus of the points that have a common distance difference between the primary beacon A and a separate secondary beacon such that the intersection between a first curve of the set and a second curve of the set identifies the position of the tag with reference to the respective primary and secondary beacons.

24. A system as claimed in claim 23 wherein, the position of the portable tag is calculated by:

dividing the area of interest into n sub-divided areas;

precalculating common distance differences for each of the sub-divided areas; and comparing the precalculated common distance and time differences with the measured values of the time delays between the primary beacon signal, and the signal from each of the secondary beacons signals to calculate and to determine the relative position of the portable tag compared to the position of the primary and each of the secondary beacons.

25. A system as claimed in claim 24 wherein, the calculation uses a fast converging halving algorithm.

26. A system as claimed in claim 24 wherein, a precalculated table can be scaled independently on each of the axes corresponding to the distance measured between the primary and each of the secondary beacons.

* * * * *